(12) United States Patent
Lewis

(10) Patent No.: US 6,900,435 B1
(45) Date of Patent: May 31, 2005

(54) DECONVOLVING FAR-FIELD IMAGES USING SCANNED PROBE DATA

(75) Inventor: Aaron Lewis, Jerusalem (IL)

(73) Assignee: Nanoptics, Inc., Jerusalem (IL)

( * ) Notice: Subject to any disclaimer, the term of this patent is extended or adjusted under 35 U.S.C. 154(b) by 0 days.

(21) Appl. No.: 09/889,586

(22) PCT Filed: Feb. 14, 2000

(86) PCT No.: PCT/US00/40002
§ 371 (c)(1),
(2), (4) Date: Aug. 1, 2001

(87) PCT Pub. No.: WO00/47978
PCT Pub. Date: Aug. 17, 2000

(30) Foreign Application Priority Data

Feb. 14, 1999 (IL) ................................................ 128519

(51) Int. Cl.⁷ ................................................ G21K 7/00
(52) U.S. Cl. ...................................................... 250/307
(58) Field of Search ................................ 250/307, 306; 378/21, 4; 358/426, 432

(56) References Cited

U.S. PATENT DOCUMENTS

| | | |
|---|---|---|
| 5,453,844 A | 9/1995 | George et al. |
| 5,724,259 A | 3/1998 | Seymour et al. |
| 6,775,349 B2 * | 8/2004 | Schotland et al. ............ 378/21 |

* cited by examiner

*Primary Examiner*—Kiet T. Nguyen
(74) *Attorney, Agent, or Firm*—Jones, Tullar & Cooper, P.C.

(57) ABSTRACT

A method for deconvolving far-field optical images beyond the diffraction limit includes the use of near-field optical and other scanned probe imaging data to provide powerful and new constraints for the deconvolution of far-field data sets. Near-field data, such as that which can be obtained from atomic force microscopy on a region of the far-field data set in an integrated and inter-digitate way, is used to produce resolutions beyond the diffraction limit of the lens that is being used. In the case of non-linear optical imaging or other microscopies, resolutions beyond that which is achievable with these microscopies can be obtained.

15 Claims, 3 Drawing Sheets

DECONVOLVING FAR-FIELD IMAGES USING SCANNED PROBE DATA

I. FIELD OF THE INVENTION

The field of the invention is the combination of scanned probe microscopic data with far field optical and other images in order to deconvolve these images beyond the diffraction limit.

II. BACKGROUND OF THE INVENTION

Lens based far-field imaging is limited in the resolution that it can achieve by the characteristics of the lens. In general, there are problems of diffraction of the lens, problems with aberration of the lens and problems of out-of-focus radiation. The latter, out-of-focus radiation problem is generally partially improved by the use of confocal imaging methodologies; in optics, non-linear imaging techniques are also useful. The solution of the former diffraction and aberration problems is partially addressed by measuring the point spread function of the lens and then using computer deconvolution to remove these effects from the image. Even the latter out-of-focus problem can be addressed without confocal or non-linear imaging by considering both the in-focus and the out-of-focus point spread function and using deconvolution routines to try and eliminate these effects. Numerous algorithms have been devised to address these problems of computer deconvolution of far-field imaging data, but none are completely successful and none of them have the ability to carry the far-field image to the realm beyond the diffraction limit as defined, for example, by the Rayleigh criterion, which is approximately ½ of the wavelength of the radiation that is being used. For visible 500 nm light this is 250 nm.

In terms of deconvolution algorithms, a powerful mathematical approach is based on the use of constraints. For example, in deconvolving a far-field image a good constraint would be to define with high precision the cell membrane of a cell that is stained with a dye and is being imaged by a lens. By precisely defining the position of a cell membrane or a portion of the cell membrane, it is possible precisely to define where the staining in the image is confined and beyond which point or points there is no staining and its associated optical phenomenon. Such a constraint would give many deconvolution algorithms a powerful advantage. Nonetheless, even though the idea is mathematically a powerful concept [Carrington et al. Science 268, 1483 (1995)], it is seriously limited in far-field optics by the inability to obtain a constraint that is better than the optical resolution.

III. STATE OF PRIOR ART

No one has previously attempted to incorporate near-field optical data and other scanned probe microscope data such as that which is obtained from atomic force microscopy to the problem of providing constraints in the deconvolution of far-field optical and other far-field imaging techniques.

IV. SUMMARY OF THE INVENTION

In accordance with the present invention, a method for deconvolving far-field optical images beyond the diffraction limit includes the use of near-field optical and other scanned probe imaging data to provide powerful and new constraints for the deconvolution of far-field data sets. Near-field data, such as that which can be obtained from atomic force microscopy on a region of the far-field data set in an integrated and inter-digitate way, is used to produce resolutions beyond the diffraction limit of the lens that is being used. In the case of non-linear optical imaging or other microscopies, resolutions beyond that which is achievable with these microscopies can be obtained.

V. BRIEF DESCRIPTION OF THE DRAWINGS

The foregoing, and additional objects, features and advantages of the present invention will become apparent to those of skill in the art from the following detailed description of a preferred embodiment thereof, taken with the accompanying drawings, in which.

VI. DESCRIPTION OF THE INVENTION

Figure 1A:
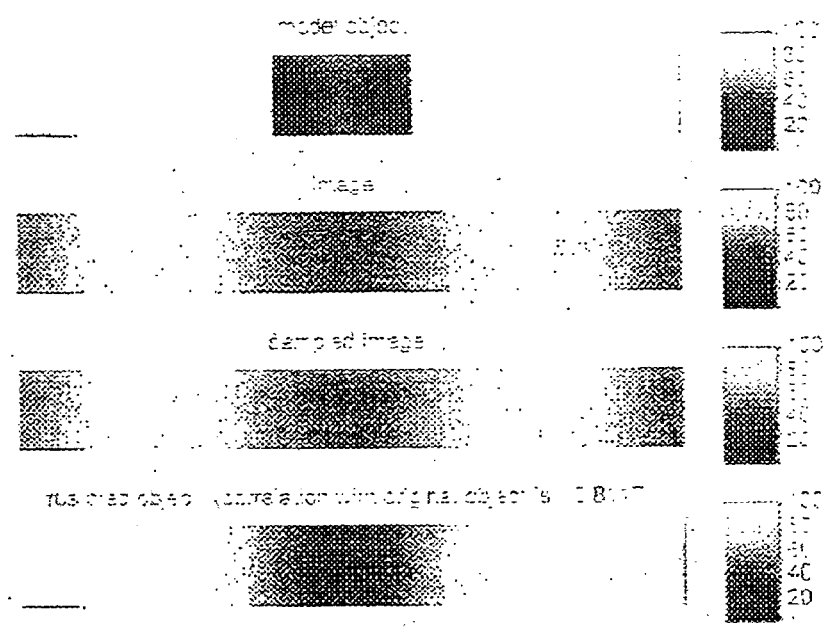
FIG. 1A illustrates a first image of a model object, a second image of the object imaged by a lens having a known point spread function, a third, or sampled image recorded by a CCD device, and a fourth image of a deconvolution of the sampled image without constraints.

The present invention incorporates data that has never been incorporated previously to resolve issues and problems in far-field imaging. This data comes from near-field optical microscopy and its scanned probe cousins, such as atomic force imaging (AFM), and presents the far-field microscopist with constraints that will dramatically improve the far-field imaging of all forms of far-field microscopy. These improvements are available for both linear and non-linear optical microscopy and even those microscopies that use particles rather than electromagnetic radiation. The invention also allows for using one form of scanned probe microscopy to deconvolve another, to thereby improve the resolution of a scanned probe microscope before this data is used in the present invention, as described below.

In accordance with the invention, it is essential to obtain near-field optical or other scanned probe imaging data in a way that is fully integrated with a far-field data set that is to be improved. In one embodiment of this invention in which far-field optical microscopic data is to be deconvolved, one useful approach to achieving the required full integration of the data sets is to use a charge coupled device (CCD) to record the far-field data that corresponds to an associated scanned probe pixel. Furthermore, it is additionally useful if the scanned probe data sets that are to be used in the deconvolution are obtained in simultaneous channels. This can be done, for example, with a tip that is multifunctional such as a tip that is both a subwavelength light source and an AFM sensor [K. Lieberman, et al., Rev. Sci. Instr. 67, 3567 (1996)] that can be used in contact or near-contact with a surface of a specimen that is being imaged.

However, even before the far and near-field imaging process is begun, lens images of a subwavelength light source of known dimension are recorded on a CCD. These images, both in-focus and out-of-focus, are used to obtain a measure of the lens point spread function (PSF), even with perturbation of the object, or sample, being imaged. This PSF is the lens function that convolutes with the functional representation of a sample to give the blurred image that is the far-field image with its associated diffraction and other problems mentioned in the Background section, above. Alternately, the convolution effect of the lens can also be determined if a known high resolution sample is imaged and the error between the real and the ideal image is represented as a blurring function introduced by the lens. Obviously, if the imaging task is fluorescence then the high resolution test object will have to be similarly fluorescent. Thus, the first task in this method is to determine the PSF of the lens that is to be used to image the desired object, or sample.

The next step is to record with the CCD the far-field image of the object. Subsequently, super-resolution optical data is recorded for specified points on the object surface. An example of such data can include defining an exact point at which the optical contrast in an object terminates; i.e., defining the edge of an object to much better than the optical resolution if the far-field image is an optical image or defining the x, y and z point, or voxel, at which there is a contrast change, and relating this point to another point of contrast change in the sample. The two points of contrast change in the sample could, for example, be at different planes as defined by the lens in the far-field, and the near-field scanned probe data, obtained through a multifunctional AFM sensor tip and simultaneously recorded, could provide not only the x–y separation of the two points but also the Z separation at a resolution that is better than any optical approach such as confocal microscopy.

The exemplary constraints listed above, or for that matter any constraints from scanned probe technology, have never been used in this cross-fertilization mode with far-field optical microscopy or, for that matter, any far-field microscopic technique. In addition, such cross-fertilization has not been used between scanned probe techniques, i.e. to use near-field optical data as a constraint at deconvolving near-field atomic force microscopy data, or the reverse. With regard to this latter mode of deconvolution there is quite a bit of synergism between, for example, the near-field optical and the near-field AFM since the functional dependence of the decay of the effect, as a function of probe sample separation, is near-exponential for the near-field optical and occurs over a much shorter distance for the simultaneously recorded AFM technique. In essence, then, the scanned probe microscopy synergism can first be used to improve the near-field scanned probe microscopy data and then that data can be applied as a constraint to the far-field microscopy deconvolution in question. At this point, it is also important to note that the order of the procedures listed in this section is not a critical part of the invention; any combination of the order of the steps or partial combination of steps constitutes this invention. For example, if the near-field optical data is not used to deconvolve to higher resolution the atomic force microscopy data, it, and the atomic force microscopy data could still be used to deconvolve the far-field data.

The CCD mentioned above is a most useful method to obtain the digitized image of the far-field, but this can also be accomplished with confocal microscopy. In the case of far-field optical microscopy it should be noted that there could be innovative ways to record the confocal data without any confocal aperture. For example, a film of material that produces a non-linear optical signal known as second harmonic generation (SHG) can be used as part of this invention to record a confocal image. In this case the light from the plane of focus is focused by the lens onto the film, such as a plastic film of purple membrane that produces SHG [Z. Chen et al., Applied Optics 30, S188 (1991)], with an intensity that is higher than from any other plane in the sample that is being focused by the lens. A film that would produce a second harmonic signal only where there is a point of light from the plane of focus in the sample could be used to replace the confocal pinhole. Such a film would act as a parallel filter for light from the plane of focus in the sample. This could be used together with an appropriate filter after the film to remove the fundamental wavelength that was illuminating the sample and to pass only the SHG to the detector which could be a CCD rather than the single channel detector that is normally part of a confocal set-up. This could be done with SHG or other non-linear optically active films.

VII. ADVANTAGES OVER PRIOR ART

Scanned probe microscopy data has not been used as a constraint in mathematical constraint algorithms to deconvolve far-field optical images. In addition, the use from multi functional scanned probe microscopy of one parameter, such as near-field optical data, to deconvolve another parameter such as atomic force microscopy data has also not been applied. The advantage over prior art arises from the increase in spatial resolution that this approach achieves.

VIII. APPLICATIONS

Methodologies for increased spatial resolution always open new doors in science and technology, as evidenced by the revolution that was caused by the introduction of the electron microscope.

Figure 1B:
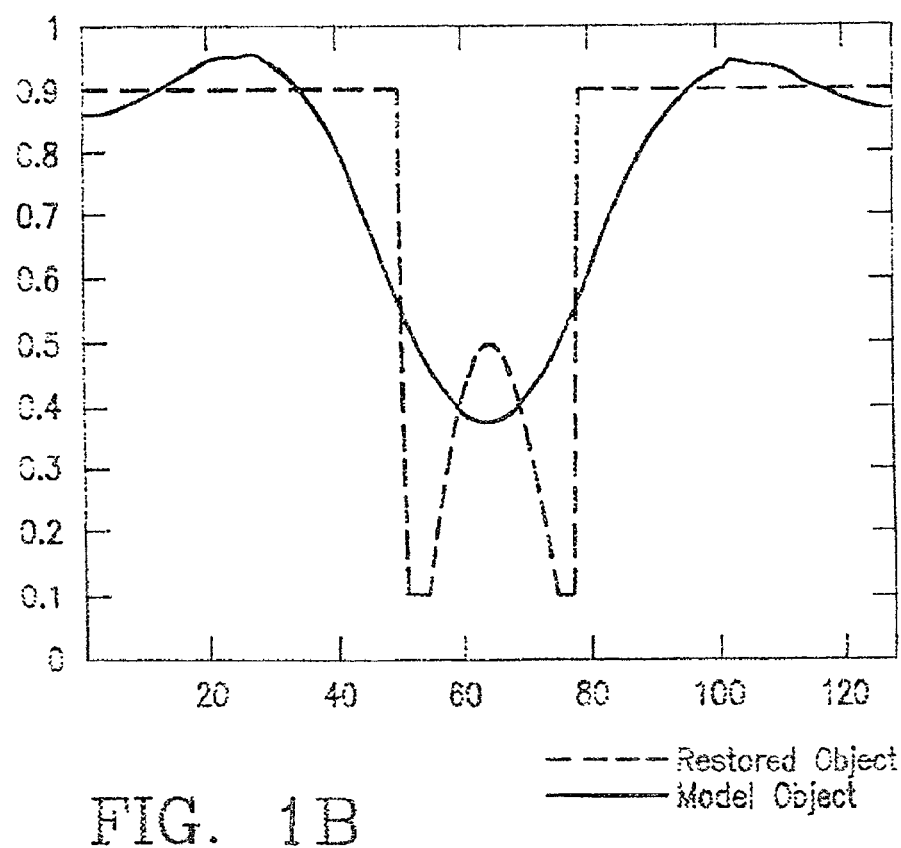
FIG. 1B is a graphical illustration of the deconvolution of FIG. 1A.

To test the essence of this invention a calculation has been performed on a model far-field optical data set, as illustrated in FIGS. 1A, 1B, 2A and 2B, to which reference is now made. In FIG. 1A there are four images, one in each of four horizontal rows. At the right-hand end of each row is an intensity legend for comparison. Starting from the top of FIG. 1A, the first row of the figure represents a model object which has a dimension that cannot be resolved optically; for example, an object having a dimension of about 0.2 micron. As may be seen in the first row, the object has a first sharp light-to-dark transition point at its left-hand edge, a second, dark-to light transition near the center, a third, light-to-dark transition to the right of the second transition, and a fourth, dark-to-light transition at the left-hand edge of the model object. When the object is imaged by a lens with a known point spread function, each of the transition points on the object is blurred because the dimensions are too small to be resolved, and the blurred image, which is the second row from the top in FIG. 1, results. When this image is recorded by a CCD there is further blurring due to the pixel character of the CCD, as illustrated in the third row. The last image, row 4 in this figure, is produced by processing the image of row 3 with a standard deconvolution algorithm without the imposition of the type of constraints that are central to this invention, in which a new approach to provide constraints is described. FIG. 1B is a chart illustrating the intensity variations produced by the model object and by the restored (deconvoluted) object.

Figure 2A:
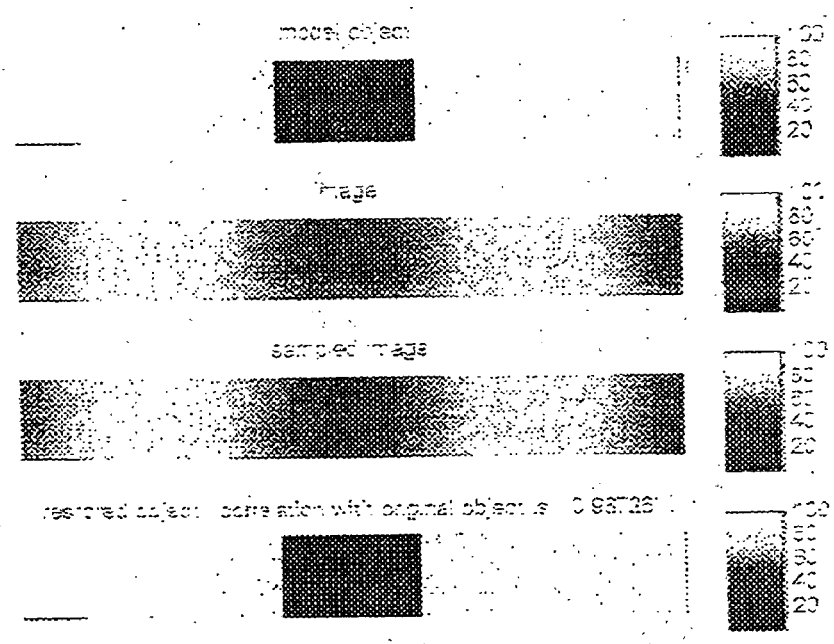
FIG. 2A illustrates the same images as FIG. 1A, wherein the deconvolution is performed with constraints obtained from near-field imaging data.
Figure 2B:
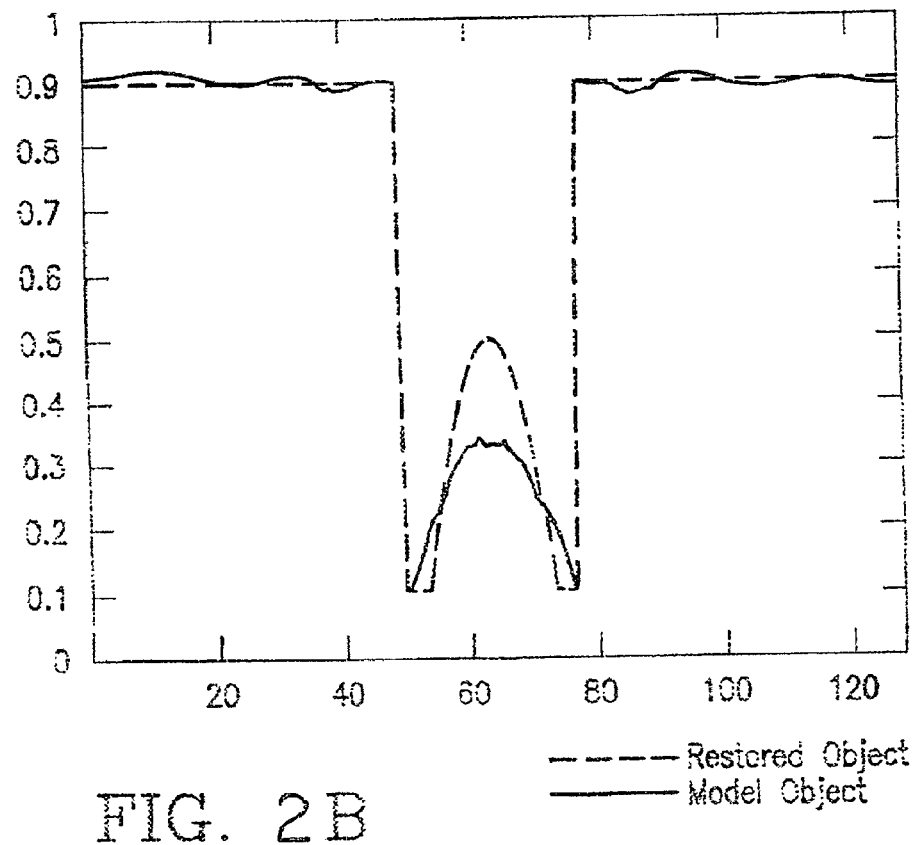
FIG. 2B is a graphical illustration of the deconvolution of FIG. 2A.

In FIG. 2A the same object, lens, and CCD are used, and rows 1–4 illustrate the same object and images as described above with respect to FIG. 1A, except that in the deconvolution algorithm four points are given the resolution of near-field optics. These points are, in going from left to right in the model object illustrated in the top row of FIG. 2A, the first, second, third and fourth alterations in contrast, as described above with respect to FIG. 1A. The results of using such constraints is seen in the vastly improved quality of the deconvolved image in the bottom row of that Figure.

Figure 3:
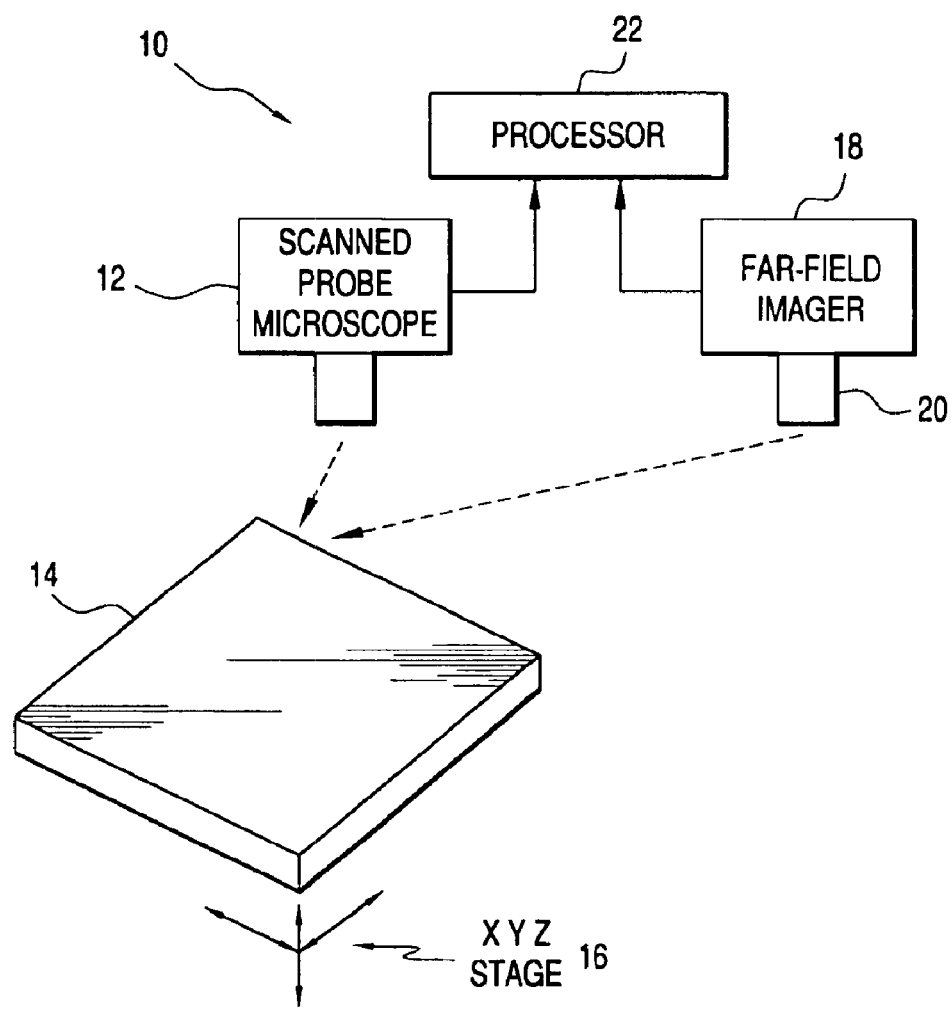
FIG. 3 is a diagrammatic illustration of equipment suitable for carrying out the method of the invention.

Diagrammatically illustrated at 10 in FIG. 3 is equipment suitable for carrying out the above-described methodology. A near field microscope such as a scanned probe microscope 12, includes a near field optical and/or a near field atomic force microscope, is positioned so that the same region of an object or sample 14 can be imaged by both the microscope 12 and a far-field imager 18 which is based on a lens 20, as indicated by the doted lines. The sample 14 has to be put on a stage 16 that can be accurately moved relative to the scanned probe or far-field imaging devices. Both the scanned probe data and the far-field imager's data can be integrated by a processor 22 that can be used either directly or with another processor so that the recorded data can be used for computation of the final image.

The near field microscope can be configured with a probe that is a near-field optical probe. This probe can be positioned at any point on the sample. One reason for incorporating such a probe would be to provide an on-line point source for determining a point spread function either with or without the sample in place. The relative movement of the sample and the probe allows for multiple point spread functions at different points in the sample where the sample could perturb the point spread function in different ways. The near-field optical probe in the near field microscope 12 can not only provide point spread functions but also other optical information at various points in the sample. In addition, the near-field optical probe can be configured so that the height of these or other points on the surface of the object or sample can be correlated with the far-field optical image. Furthermore, the location of the borders of the sample can also be assessed. Such height information can also be obtained by other types of probes in the near field microscope, including an atomic force probe, which can also provide information on the borders of the object or sample.

The processor records and integrates all the data, including the optical information, height information, information on the object or sample borders and/or accurate movement of the object or the sample relative to the near field microscope and/or the far field imager. This data, together with any other pertinent imaging information, can be incorporated into a deconvolution algorithm that can then use this data to produce a super-resolution deconvolved image.

As an example of the closed-loop operation of the illustrated equipment, an image is obtained with the far-field imager and the position of a particular feature is determined with the near-field microscope. The images are directed to the processor, where they go through the deconvolution algorithm, using the portion of that particular feature as a constraint. The deconvolution algorithm may provide calculated information about another feature at another position in the far-field image, and the near-field microscope is then used to measure that new feature. The measured information is used to determine the error gradient in the position of the new calculated feature, and in closed loop fashion the algorithm is adjusted to improve the result.

In various embodiments of the invention, the far-field imager may include non-optical linear optical imaging and the imaging and the image recording may include recordation of interdigitated and correlated data sets of scanned probe and far-field imaging. It is beneficial but not an absolute requirement that neither the near field microscope nor the far-field imaging device obstruct viewing of the object or sample from one or the other device.

Although the invention has been described in terms of preferred embodiments, it will be understood that numerous variations and modifications may be made without departing from the tnie spirit and scope thereof as set forth in the following claims.

What is claimed is:

1. A method for deconvolving far-field optical images for improved image resolution, comprising:

employing near-field microscopy as a point source that is positioned to provide images of specific regions of a sample corresponding to specific pixels in a far field imager, the near-field microscopy being movable with respect to a surface of the sample to obtain near-field optical data;

recording near-field data for the relative height of the point source with respect to the sample surface and near-field data for the location of the borders of the sample;

obtaining far-field optical image data corresponding to the sample; recording said far-field optical image data simultaneously with the data obtained from the near-field optical microscopy; and incorporating the far-field and the near-field optical data in deconvolution algorithms using the data from the near-field imaging for added precision of the far-field imaging or as a constraint with the deconvolution algorithms to produce a deconvolved super-resolution image.

2. The method of claim 1, further including obtaining the near-field optical microscopy data in simultaneous channels.

3. The method of claim 2, further including fully integrating the far-field optical data with the near-field optical data.

4. The method of claim 1, further including obtaining said far-field optical image data through a lens.

5. The method of claim 4, further including determining a point-spread function of the lens prior to obtaining said near-field and said far-field data.

6. The method of claim 5, wherein determining the point-spread function of the lens includes determining the difference between real and ideal images of a sample to determine a blurring function of the lens.

7. The method of claim 6, further including determining the point spread function of the lens with atomic force topography information from said sample.

8. The method of claim 1, wherein employing near-field optical microscopy includes scanning said sample with subwavelength resolution to define optical contrast points on said sample.

9. The method of claim 1, wherein obtaining said far-field optical image data includes non-linear optical imaging.

10. The method of claim 1, wherein recording far-field and near-field optical images includes recording interdigitated and correlated sets of image data.

11. The method of claim 1, further including determining a difference between the deconvolved optical image and one or more points of the near-field image to compute an error value for directing the computation of a newly deconvolved image.

12. The method of claim 11, wherein the deconvolution is a closed loop in which the error value is minimized.

13. The method of claim 1, wherein employing near-field microscopy includes employing a scanned optical probe.

14. The method of claim 1, wherein employing near-field microscopy includes scanned probe imaging combined with atomic force imaging to provide two near-field images.

15. The method of claim 1, further including combining near-field and far-field imaging without obstructing the far-field imaging to produce fully integrated data sets for deconvolving the optical images.

* * * * *